Jan. 13, 1970 G. R. LANG 3,489,853

DATA TRANSMISSION BY PULSE WIDTH MODULATION WITH AMPLITUDE ADJUSTED TO ELIMINATE DC DRIFT

Filed June 6, 1966 3 Sheets-Sheet 1

INVENTOR.
GORDON R. LANG
BY Westell & Hanley

INVENTOR.
GORDON R. LANG
BY
Westell & Hanley

INVENTOR.
GORDON R. LANG
BY Westell & Hanley 3,489,853

DATA TRANSMISSION BY PULSE WIDTH MODULATION WITH AMPLITUDE ADJUSTED TO ELIMINATE DC DRIFT

Gordon R. Lang, Rexdale, Ontario, Canada, assignor, by mesne assignments, to Ferranti-Packard Limited, Toronto, Ontario, Canada Filed June 6, 1966, Ser. No. 561,655
Claims priority, application Canada, July 16, 1965, 935,956
Int. Cl. H03k 7/10
U.S. Cl. 178—68 7 Claims

ABSTRACT OF THE DISCLOSURE

A signal system conveys information by time intervals between signal crossings of a predetermined amplitude level. To eliminate DC drift, the amplitude of signals of short intervals is increased, and the amplitude of longer signal intervals is correspondingly decreased.

This invention relates to a method of transmitting information, and to a means of providing information in accord with such method.

The invention provides a method and means whereby the information is carried in a signal whose potential varies above and below a predetermined potential level hereinafter sometimes called the datum level. The length of the time interval between successive crossings by the signal potential level with such datum level is used to represent a symbol in the code being used. By selection of time intervals of two different lengths, information may, in this manner, be transmitted in binary form. By selection of time intervals of a larger number of lengths, information represented by more than two alternative symbols may be transmitted. Since a symbol is sent in the interval between successive crossings of the datum level, the transmission rate will in some cases be faster and in some cases double the transmission rate with other encoding methods which require one or more cycles of a signal to portray a symbol.

The invention is applicable to electrical signals transmitted on a wire channel or on a wireless channel, and whether or not the signals produced in accord with the invention are sent "as is," or are modulated on a carrier wave or used in some other way, but the invention is of particular advantage when used for the transmission of information along a telephone channel within the range from 200 to 3200 cycles per second.

Within this frequency range and to some extent outside such range, the coding system lends itself to efficient use of a channel (and by channel is included wired and wireless transmission systems) and permits the use of a coding method; which provides a bit rate tending toward a constant average bit rate; and which provides a signal having a relatively high tolerance to noise.

In certain aspects of the invention, efficient use of the channel arises because the coding method allows the direct current component of the transmitted signal to be lessened and in some cases substantially eliminated, whereby it is found that the various rates for the signal may be selected so that the average frequency is located below the centre of the frequency band width provided, and wherein the band width from the average frequency toward the upper limit may be efficiently used without a consequent requirement for use of a band of equivalent width from the average frequency downward.

Noting that the invention involves a transmission of information by the varying of lengths of what in effect are half cycles of the signal, and hence involves an intrinsically varying signal frequency; it should also be noted that there are a number of techniques available for maintaining, with the inventive method, a frequency or bit rate tending toward an average value. Assuming for example, that the desired frequency is that represented when the half-cycle intervals are (say) six units long, then information could be transmitted in the binary form where the "mark" and "space" intervals are 5 and 7 units long tending toward an average range which approaches the frequency proportional to the inverse of 6 units (relative to the 5 and 7 units just mentioned). It is true of course that the average of 1/5 and 1/7 is not 1/6 but it should also be noted that the intervals and frequencies respectively need not be integrally or harmonically related to one another. Thus in the example given either the 7 or the 5 units interval could be made slightly longer or shorter if it is desired to provide a certain average. Indeed in many applications it may be found desirable that the lengths of the time intervals between successive crossings of the signal level with the predetermined level be related in other than an arithmetic manner.

What will usually be of importance is the rate at which bits may be transmitted and it will usually be desirable to select intervals, such that in the encoding method used, the bit rate will not deviate too much or for too long a continuous period from the rate at which information for transmission becomes available (since too long a deviation of this type will unduly increase the design requirements on the data storage means) and thus a bit rate tending toward a constant average allows easier coupling of the system of encoding information to the source of information.

The method allows many variants on the techniques discussed, where for example in binary transmission, in order to approach a more nearly constant average rate, one symbol might be sent by a time interval of intermediate length, while the other symbol might be sent by intervals of longer and shorter length with the longer and shorter length intervals being alternated or otherwise periodically alternatively allocated in groups to assure a bit rate tending toward a desired constant average. As many different lengths of intervals for multi-level transmission may be provided, as desired, with a consequent requirement of more complexity in the receiver decoding function.

For efficient use of the channel, that is the frequency band width allotted, and to improve the quality of the transmitted signal for decoding, it is desirable that the time integral of the potential of the difference between the level of the transmitted signal and the predetermined level over successive half cycles of the signal tends to be equally above and below the predetermined potential level, it being noted that each allotted half cycle (of variable length) will be below and above such predetermined level. In a preferred form of the invention, equality of the time integrals of potential difference alternatively greater and less than the predetermined level, is achieved by amplitude modulation of the signal for transmission so that the time average difference of the potential of the signal from the datum level, over a half cycle varies inversely as the time interval of existence of the half cycle. Ideally therefore, the time integral of the potential difference of the signal from the datum would, over a half cycle, be constant from one half cycle to the next, independently of the half cycle length and thus the average direct current component of the signal would be zero. To the extent that this is achieved, it is found that frequency components on the low frequency side of the lower end of the band width allotted, tend to be suppressed while harmonics of the signal frequency are not so suppressed whereby efficient use of a band may be achieved by producing a signal having an average zero direct current component and locating the average signal frequency toward the lower end of the band, for example, at 1200 cycles in a band width extending between 200 cycles and 3200 cycles per second.

A further advantage of maintaining the average direct current component at zero is that the most common techniques of decoding this information, will tend to detect signal potential crossings with a level intended to be the predetermined level of the transmitted signal while actually the "level" detected at the decoder is a succession of potential levels so located that the direct current component of the received signal relative to such levels tends toward zero. Hence, in such methods, the accuracy of the determination at the receiver of the predetermined level and hence of the signal information is increased with the lowering of any direct current component in the transmitted signal.

It should be noted, that, if the direct current component is not eliminated that in many cases detection may still take place but that the tendency to error in the receiver or decoder, in distinguishing between different time intervals will be increased and the tolerance to noise disturbances will be decreased.

In drawings which illustrate a preferred embodiment of the invention:

Figure 1:
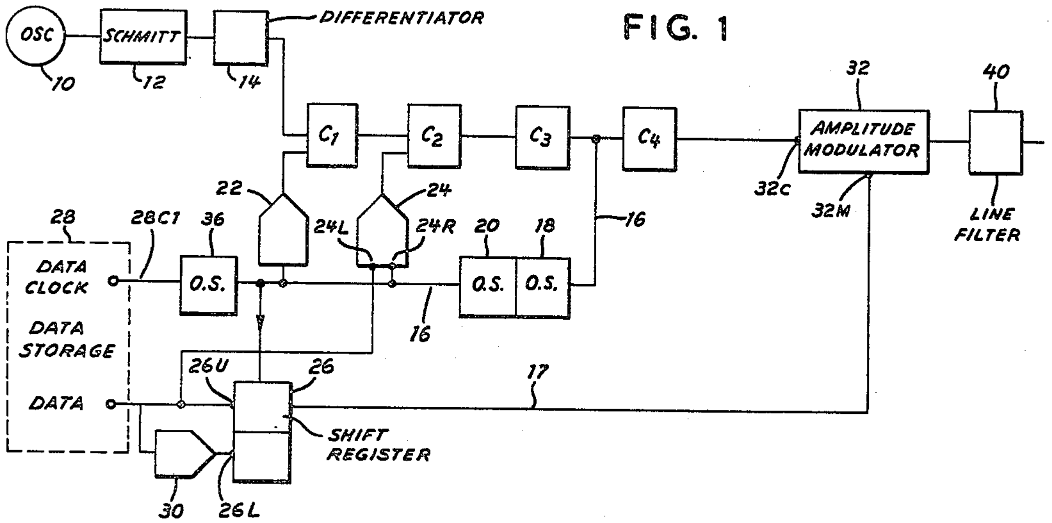
FIGURE 1 shows means for encoding a signal in accord with the invention.

In the drawings will be shown as an example means for encoding information in binary form in half-cycles of 5 unit length for "mark" and 7 unit length for "space."

Figure 3:
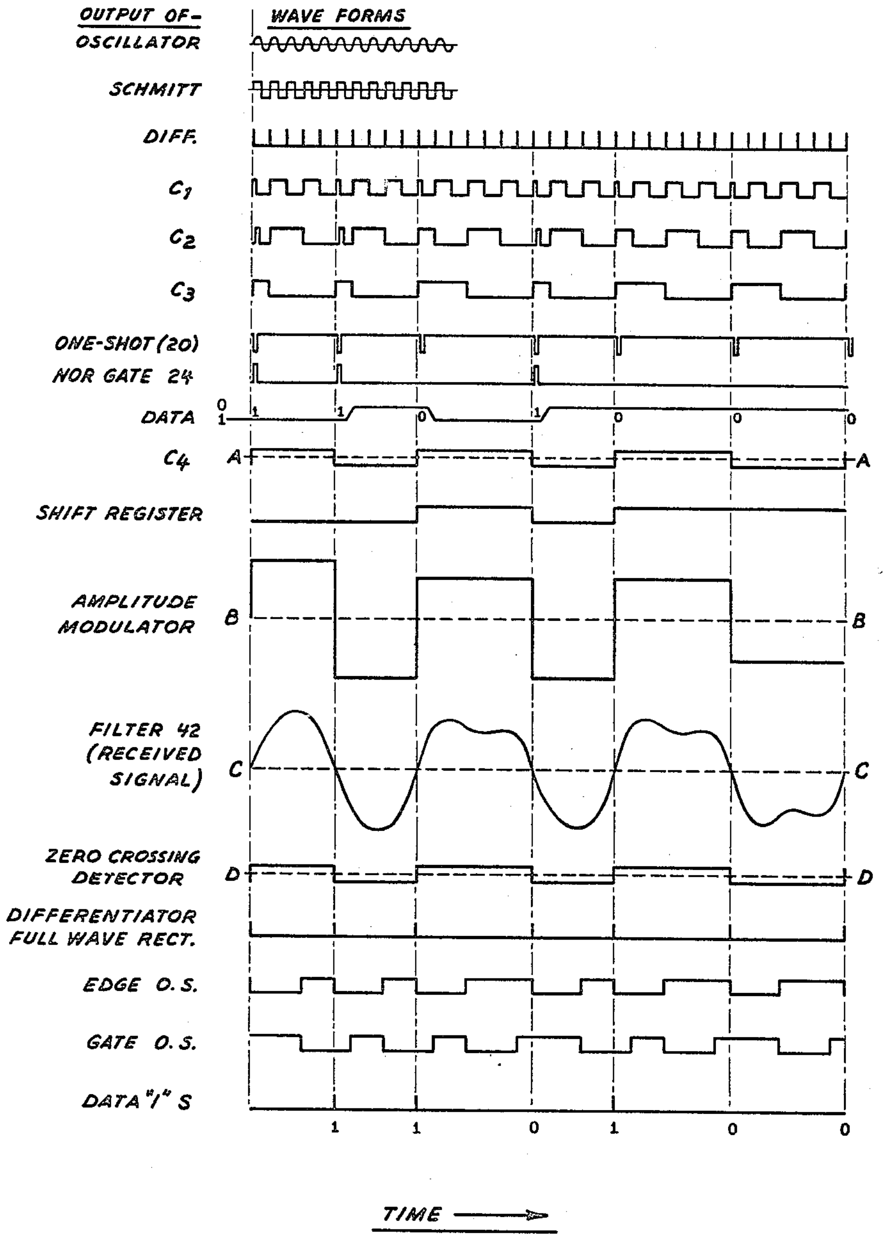
FIGURE 3 shows the wave forms produced by the circuitry of FIGURES 1 and 2.

In the drawings: an oscillator 10 is designed and constructed to provide a sine wave output of constant frequency which is squared by a Schmitt trigger 12 and the output of the Schmitt trigger is differentiated by a differentiator 14 to provide a regular pulse output. The wave forms of the outputs of the circuit components described are shown in FIGURE 3. The pulse output of the differentiator is fed through three binary counters C1, C2, C3 in series and these counters being of the binary type would in the absence of any other effect, produce at the output of counter C3 a positive going wave edge for every 8 pulse outputs of differentiator 14 (such pulse outputs being hereinafter referred to as "clock pulses"). This result is achieved since the output of C1 produces a positive going wave edge for every two clock-pulses entering C1; and the outputs of C2, and C3, respectively, produce a positive going wave edge for every two positive wave edges at their respective inputs. The output of C3 is fed back along the line 16 through a pair of one-shot devices 18 and 20 in series, which produces at the output of one-shot device 20 (electrically farthest from counter C3) a negative going pulse corresponding to each positive going edge at the output of C3. The one-shots 18 and 20 are designed to delay the occurrence of the last mentioned negative going pulse, relative to the positive edge output of C3, a sufficient time to provide such negative going pulse after the completion of response of the counters C1, C2 and C3 to the stimuli causing the output from C3. On the other hand the delay provided by one-shots 18 and 20 is designed to be small relative to the interval between successive pulses from the differentiator. The resultant pulse output from the one-shot 20 is applied, along line 16, to the inputs of NOR gates 22 and 24 which are in turn connected to the input of counter C1 and to the input of counter C2 respectively. The negative edge of the pulse of the one-shot 20 is applied to the C1 NOR gate 22 producing a positive going edge at the output thereof and because of the delay at the one-shot gates 22 and 24, this positive going edge is arranged to occur at the input of counter C1 just at the completion of response to the last preceding clock-pulse from differentiator 14; but the delay after such clock-pulse is for a period of time, short relative to the spacing of the clock-pulses. The input from the NOR gate 22 to the counter C1 is arranged to be (as far as the counter C1 is concerned) connected to the same input as the clock-pulse input from differentiator 14 although a buffer is provided between these inputs to prevent the signal from the NOR gate 22 affecting the differentiator 14. Because of this feedback from the output of C3 through the NOR gate 22, then in the absence of any other effect, every 7 clock-pulses to the counter C1 produces an eighth input pulse to the same counter C1 whereby the positive going output of counter C3 occurs for every 7 clock-pulses as far as the apparatus has so far been explained.

It will be noted that there are two inputs to the NOR gate 24. One input 24R is connected to the output from one-shot 20. The other input 24L is connected to receive the input from a data source 28. The data source 28 supplies to input 24L a zero potential signal when a "zero" or "space" is desired to be sent by the system and a negative potential signal when a "one" or "mark" is to be sent by the system. The system will be discussed in relation to the sending of the signals 1 1 0 1 0 0 although the discussion of the operation will be principally concerned with the sending of the first one and the first zero. The output of NOR gate 24 is connected to form an input of counter C2 along with the input from counter C1. Both inputs are actually the same but buffering means are provided so that the input from NOR gate 24 does not affect binary counter C1.

NOR gate 24 is designed, so that when there is a positive or "zero" signal at either or at both inputs 24L or 24R, the output of the NOR gate 24 to the input of C2 is negative or "one" but when there is a negative or "one" signal at both inputs, the output of the NOR gate will be positive or "Zero." Thus it will be seen that the output of NOR gate 24 will be negative or "one" at all times except when receiving a pulse from the one- shot 20 since the input from the one-shot will otherwise be "zero" and when a pulse from the one-shot 20 is received will only be other than "one" if the data input is "one" at the time that a pulse is received from one-shot 20. Thus when the data input 24L is at "zero" the pulses will not affect the "one" output from NOR gate 24 but when the data input 24L is "one" the pulses from one-shot 20 will cause a positive going pulse to be emitted from NOR gate 24 which will act on counter C2 in the same way as a positive going edge from counter C1. It will be noted that because of the delay contributed by the one-shots 18 and 20, the positive going edge will be applied to counter C2 just after a time when it has completed its response to a signal from counter C1 but with a delay small relative to the clock-pulse interval. Since the effect of a positive going edge from NOR gate 24 (or from C1) at counter C2 is equal to the occurrence of two clock-pulses at the input of counter C1, it will be seen that the result is, that an interval beginning with a positive going edge from counter C3 causing a pulse from one-shot 20 when a negative or "one" signal appears at 24L will be followed 5 clock-pulses later by the next positive going edge from counter C3 since the feed back through NOR gate 22 replaces one clock-pulse of the 8 clock-pulses otherwise required and the feed back to counter C2 replaces two more of such clock-pulses.

Thus it will be seen that while clock-pulses are supplied to C1 the existence of a negative or "one" signal at 24L will cause positive going edges to emerge from C3 five clock-pulses apart, while the existence of a positive or "zero" signal at 24L will cause positive going edges to emerge from C3 seven clock-pulses apart.

Thus it will be seen that the data input to 24L supplying "one" and "zeros" conveying binary information by a synchronization system to be hereinafter described, set to indicate 1 1 0, 1 0 0 will produce at the output of C3 seven successive positive going edges separated by: 5, 5, 7, 5, 7, 7 units respectively. The output of C3 is applied to the input of a further binary counter C4 of the same type as C1, C2 and C3 so that for every two positive going edges emanating from C3 will cause at the output of C4 a square wave (shown in Figure 3) having alternate positive and negative intervals of 5, 5, 7, 5, 7, 7 units respectively. The terms "positive" and "negative" are used here since square wave may be considered as having an alternating component relative to a predetermined level A—A located midway between the positive and negative limits of the square wave and thus has its half cycles defined as 5, 5, 7, 5, 7, 7, units long respectively. In this way it will be seen that the information from the data input is maintained at the output of C4 by the half cycle (alternating) lengths of the C4 signal.

The means for supplying the data information to NOR gate input 24L will now be discussed. The output of one-shot 20 is supplied to the control gate of a shift register 26 having two inputs 26U from a data source 28 and 26L which is the inverted output of the same data source through an inverter 30. In accord with well known design, the shift register is designed to provide, on receipt of a pulse from one-shot 20, the signal at an output line 17 which corresponds to the input then existing at input 26U. The output of shift register 26 is connected to the modulation input 32M of amplitude modulator 32. The output of binary counter C4 is supplied to the main or "carrier" input 32C of amplitude modulator 32.

The output of counter C4 is applied directly to the "carrier" input of amplitude modulator 32 so that the arrival of the positive or negative going edge of the square wave from counter C4 arrives before the initiation of the corresponding modulating signal on the shift register 26, by the time delay contributed by the one-shots 18 and 20. The effect of this on the output of modulator 32 is however so small it can usually be ignored. If the time difference should be of importance in a special application, this may be eliminated by provision of time delay means between C4 and the amplitude modulator.

As described above, the data existing at the input to the shift register 26 causes a square wave of the correct length between coincidences with level A—A that is a 5 unit half cycle length at the output of C4 for a "mark" and a 7 unit length at the output of C4 for a "space" and such wave appears at the "carrier" input of amplitude modulator 32 contemporaneously with the modulating signal corresponding thereto. The amplitude modulator is adjusted so that it will make the amplitude of the 5 unit half cycles from C4 seven (amplitude) units and the amplitude of the 7 unit half cycle five amplitude units. (It is noted that the amplitude levels specified will not be achieved in mathematically exact form but will be of practical accuracy within the design limits of the equipment provided. Thus as a result of the input from C4 and from shift register 26, a signal is produced at the output of modulator 32 wherein the integral of potential with time is equal over a half cycle between successive crossings of the zero alternating current datum indicated as B—B whether the half cycles are 5 units long or 7 units long and whether they occur above or below the line B—B; hence the average direct current component of such signal tends towards zero.

The data appearing at the input 26U of the shift register 26 is obtained from any suitable data storage device schematically indicated at 28 and the data storage device in accord with one of a number of well known alternatives will be fed to the shift register inputs 26U (and 26L in inverted form) on receipt of a pulse from the one-shot 20 applied to the data storage clock input 28 Cl through a one-shot delay 36. Thus a pulse from one-shot 20 causes shift register 26 to release to amplitude modulator 32 the data signal then occuring at the input of the shift register. At a time later, by the delay contributed by one-shot 36, the next data signal is presented by the data storage device 28 to the inputs 26U (and 26L in inverted form) of the shift register 26. This input is therefore ready for release to the amplitude modulator on receipt of the pulse from one-shot 20 next following the pulse which caused the data to be provided to the shift register inputs.

Figure 5:
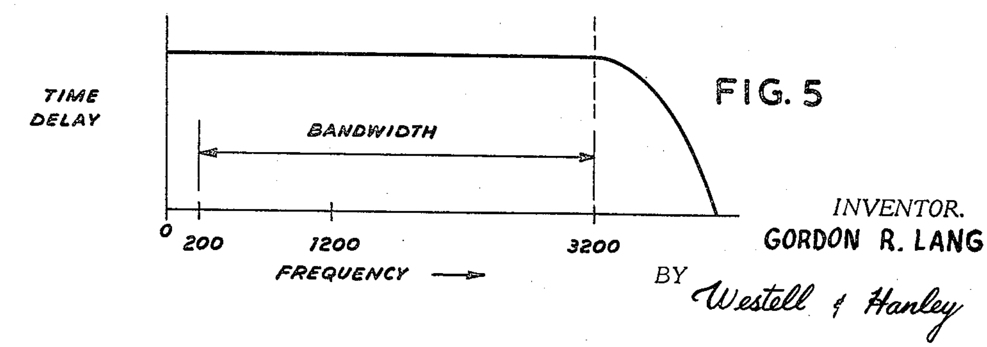
FIGURE 5 shows a graph of the time delay of a component of FIGURE 1 plotted against frequency.

For power efficiency and to avoid transient currents and to best match the output of the amplitude modulator 32 to the channel, a line filter 36 is provided connecting the amplitude modulator to the channel 38. For best results the filter 40 (such as a Bessel low-pass filter for $n=4$) has the characteristic of a flat response from the lower end of the frequency band provided, to a frequency near the upper limit, at which the response reduces gradually, whereas, as shown in FIGURE 5, the time delay in the filter is flat across the frequency range as there indicated. At filter 40, a flat time delay characteristic is desirable since it avoids any tendency toward overlapping in time between succeeding signals or lengthening or shortening of half-cycle intervals. The signal wave form from the output of filter 40 is shown as the "received signal" in FIGURE 3. In FIGURE 3 the time delay contributed by the filter 42 and during transmission, is ignored, since as long as these delays are constant, or substantially constant across the band width of the device they do not affect the operation thereof.

It will be noted from FIGURE 3 in reference to the wave form called "Received Signal" therein, that the modification of the signal from square to quasi-sinusoidal shape has not altered the fact that successive intersections of the signal with the median line C—C being the line set to provide a direct current component tending toward zero, are separated by the input 7 or 5 unit spacings depending on the binary information input to the amplitude modulator unit.

The filter 40 acts to remove higher order harmonics from the signal, which are not needed for data construction at the receiver. Such filter 40 for a fixed power input allows a maximum amount of power to be concentrated in the information carrying part of the frequency spectrum.

There has been described a system for transmitting signals wherein the time interval between the intersection of the varying signal potential with a predetermined level (here C—C in the curve marked "Received Signal," portrays the information. In information carrying signal thus produced may be used in many ways and decoded or detected in many ways, and may be sent as produced or alternatively may be modulated on a carrier and however sent, the information may be decoded in any desired manner.

Figure 2:
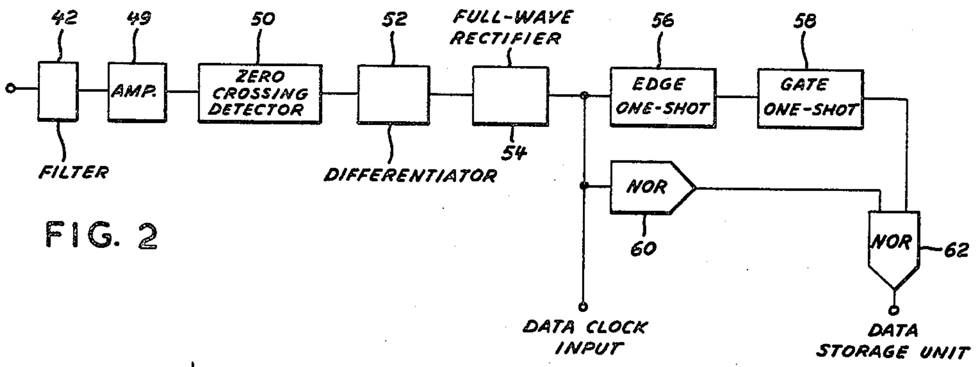
FIGURE 2 shows an example of means for decoding such a signal.
Figure 4:
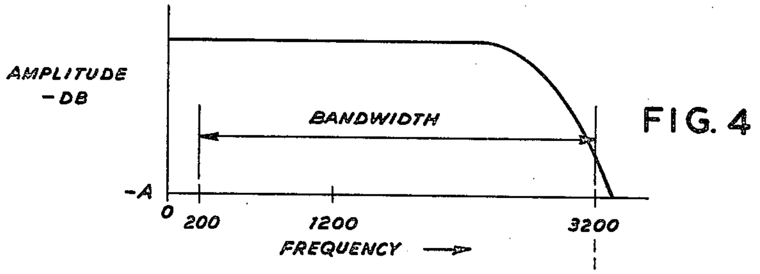
FIGURE 4 shows a graph of the amplitude response versus frequency response of one of the components of FIGURE 1.

Under many methods of detection, the use of amplitude modulation as above described in combination with the method of using the length of half length intervals to carry the information provides for detection of the information without distortion. On the other hand in many applications it will be possible to recover the information from a signal where the half cycle lengths convey the information, but where amplitude modulation as above described, is not used and this is considered to be within the scope of the invention which is concerned with the method of incorporating the information for transmission. Hence it will also be understood that it is within the scope of the invention, to provide amplitude modulation which renders the time integral of shorter half cycle lengths more nearly equal to the time integral of longer half cycle lengths than the lengths of the half-cycle intervals themselves, but without providing equivalency of the time integrals of half cycle intervals.

Where the information is sent in accord with the invention, without modulation, in the frequency range 200 to 3200 cycles for use on a telephone channel or the like, there is herein described a convenient method of decoding the information. This is shown in FIGURE 2. In FIGURE 2 the input is applied as shown in FIGURE 3 "Received Signal" through a filter 42 similar to the filter 40 as indicated in FIGURE 1 and whose characteristics are shown in FIGURES 4 and 5. The output of filter 42 which acts not only as described in relation to filter 40 but also to eliminate some noise distortion superimposed on a transmitted signal during transmission; is applied to means for ascertaining when the potential of the received signal crosses the level C—C. In this way could be determined the time interval of a half cycle and from this the information may be obtained. However it will be noted that the level C—C is not independently transmitted and hence a reconstructed level as near as possible to C—C must be provided; detected in this particular embodiment, from the transmitted signal. Hence when a "predetermined datum level" is referred to in relation to the transmitter it will be realized that the level C—C is referred to whereas when a "predetermined datum level" is spoken of in relation to the receiver it will be realized that a reconstructed level approximating as closely as possible the level C—C is referred to. The shape of the signal appearing at the output of filter 42 is similar to the output of filter 40 subject to noise distortion encountered during transmission although as previously explained some noise contributed by transmission will be eliminated by filter 42. In the means to be described the reconstructed predetermined level is constructed from the signal itself.

Thus in the receiver shown, the potential level at which no average direct current occurs is determined as are the crossings of the received signal with said level. The crossings may be detected in any desired manner but one manner which has been found particularly suitable is an adaptation of an "audio limiter" which acts as an amplifier for input signal levels on either side of a datum level up to a specific potential difference therefrom. Above such potential difference either above or below the datum the adapted audio limiter suppresses any consequent increase in the output. The signal output from the adapted audio limiter, therefore, amounts to a sampling of an input signal which sampling indicates where the crossing of the received signal, with a predetermined level, occurs. Since the audio limiter, in accord with the invention, is designed to locate the predetermined datum at the level where zero D-C occurred, the datum may be considered as zero volts A-C and the device is sometimes referred to as a "zero crossing detector."

Figure 6:
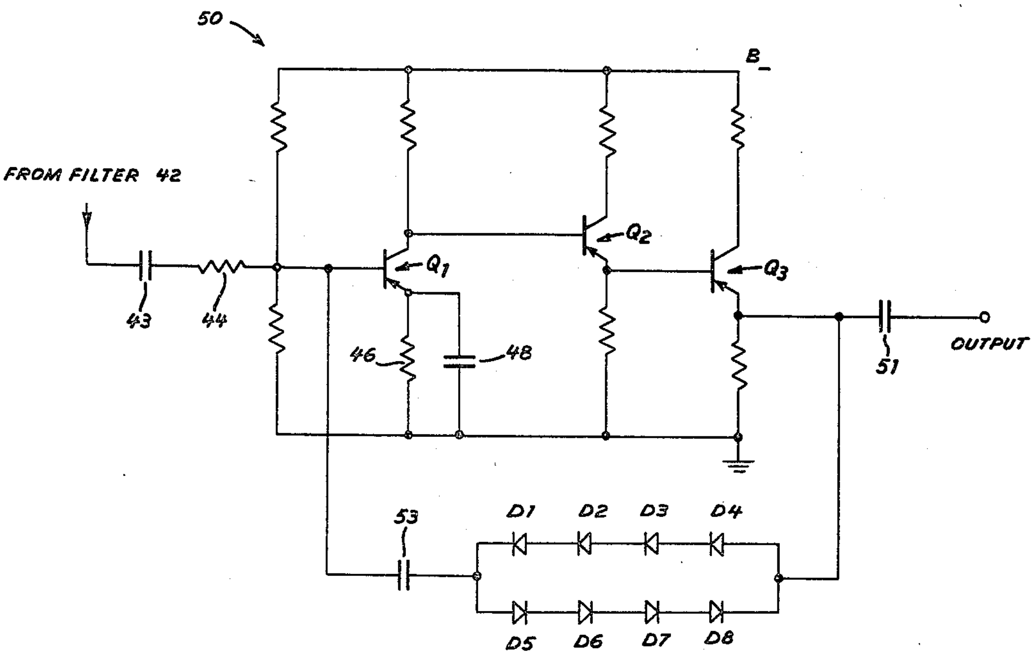
FIGURE 6 shows a component of the receiver.

The modified audio limiter 50 is shown in FIGURE 6 wherein the output from the filter 42 is applied through amplifier 49 (see FIGURE 2) to a condenser 43 and resistor 44 in series and then through 3 amplification stages in series represented by transistors Q1, Q2 and Q3. These amplification stages, are biased by suitable resistances as shown, and at the input stage at Q1 the bias resistor 46 for the emitter is in parallel with the condenser 48. The output of the third stage Q3 which is obtained from the emitter thereof, is connected back to the base of the Q1 stage through two parallel circuits in serdies with a condenser 53. The parallel circuits comprise: a series of diodes D1 to D4 oriented in one direction forming one arm of the parallel circuit and a series of diodes D5 to D8 oriented in the other direction and forming the other arm of the circuit. The transistor stages Q1 to Q3 are connected for biasing between a direct current supply and ground and these are used to bias the emitters and collectors of the transistors and the input to transistor Q1 by means of the biasing resistors as shown. The circuit is designed so that when the voltage at the emitter of Q3 differs from the voltage at the Q1 base by less than the breakdown value of one of the series of diodes D1 to D4 or D5 to D8, the circuit acts as a normal amplification circuit and the circuit is designed so that the breakdown voltage for the parallel circuits is equal, although of opposite polarity. On the other hand once the voltage difference from Q3 to the input of Q1 is greater than the breakdown voltage for one of the parallel circuits, that circuit conducts and a non-linear negative feedback is provided, preventing further amplification. Thus amplification limits of equal value above and below a central voltage are provided.

In operation, when no signal or a signal at the predetermined potential appears at the input to condenser 43 a quiescent output appears at the emitter Q3 and for output voltages ranging about or below the quiescent value up to the breakdown point of the diodes the output varies as the input to the limiter. For voltage deviations of the output terminal at the emitter Q3 from the base of Q1 greater than the design limit for the rectifier circuits, the feedback through one of the diode circuits, prevents further amplification.

The resultant output signal from the Q3 emitter is passed through a condenser 51. The output of the condenser 51 is shown in FIGURE 3 as the output of the zero crossing detector and may be considered as a substantially square wave on which the top and bottom limits of the wave are equally potentially separated from a line D—D where the alternating component of the signal will be zero. It will be noted that the crossings of the square wave of the line D—D will coincide with the crossings by the output of C4 with the line A—A to the extent that the direct current component of the received signal is eliminated. The output of condenser 51 is differentiated at differentiator 52 and this output is rectified at rectifier 54 whereby pulses are produced as shown in FIGURE 3 although these pulses will have a slight measurable thickness because of the deviations of the output of the zero crossing detector from a strictly square wave, this will not matter because the leading edge of the pulse is used in the following determination of the encoding intervals. The pulses obtained from rectifier 54 are fed to an "edge one-shot" 56 which produces in response to the positive going pulse, a negative going edge of a square wave which is 3 clock intervals long followed by a positive going edge of square wave, either two or four transmitter clock intervals long. The output of "edge one-shot" 56 is fed through a similar "gate one-shot" similar in operation to the "edge one-shot" which produces a further delay of 3 clock intervals in the positive going edge. The two one-shot devices in series, therefore, act as a 6 interval delay which it will be noted in intermediate the 5 unit half cycle length for "mark" and the 7 unit half cycle length for "space."

The output of the full wave rectifier is applied through a NOR gate 60 which inverts the signal providing at the output a negative going pulse to one input of a NOR gate 62 while the output of the gate one-shot 58 is applied to the other input of NOR gate 62. The NOR gate 62, is designed so that when both inputs are "one" the output is zero and when one of the inputs is a zero the output is 1. Thus between the inverted pulses from NOR gate 60 it will be noted that the output will be 1 or negative and that the output will be a positive pulse if on receipt of the inverted pulse the output of the gate-shot is at one. The first of the message pulses causes, from gate one-shot 58 a negative or "one" signal five units later and up to six units later. At 5 units later when the "one" condition exists at the gate one-shot input to the NOR gate 62 the second negative pulse from NOR gate 60 appears creating at the output of NOR gate 62 a positive pulse which may be interpreted as a 1. Similarly at the time or arrival of the third (inverted) pulse from NOR gate 60 at the input to NOR gate 62 the other input is negative or "one" since the delay of the third pulse behind the second pulse is only five intervals. Here again, a positive going pulse, will be emitted from NOR gate 62 signifying 1. However at the time the fourth pulse arrives from NOR gate 60 the interval behind the third pulse is 7 pulse intervals and since the third pulse and hence the output of the gate one-shot 58 which has its positive going edge caused by the third pulse occuring six units after the third pulse, has returned to zero when the fourth pulse arrives from NOR gate 60, no pulse is produced at the output of NOR gate which may be considered as indicating a zero. In a similar manner, and as shown by the curves in FIGURE 3 the last 3 elements of the message 110, 100 are detected in a similar manner. The resultant output from the NOR gate 62 comprising pulses or not at the time designated is fed to a suitable data storage device unit (not shown) where the signal from NOR gate 62 is compared with the pulse output of the full wave rectifier supplied to a data clock input and as a clock input whereby by reading the output of the NOR gate 62 when pulses are received at the data clock input, the 1's and 0's of the transmitted signal may be determined.

It will be noted that the level for which crossings between the detected level and the received signal as detected by the crossing detector 50 is that where the received signal has zero direct current. Where therefore, the transmitted signal is amplitude modulated in such a manner that the time integral of potential difference from a predetermined datum, over a half cycle is independent of the time length of the half cycle, then the detected level will remain reasonably constant and the time intervals between coincidences or crossings with this level will approach closely to the transmitted intervals and discrimination between the different length half cycles may be made easily and with a large tolerance to noise.

Where the amplitude modulation does not, with tolerable accuracy, render the time integral of potential difference, over a half cycle constant, regardless of half cycle length, or if amplitude modulation is not used, then the detected level with receivers of the type shown, will fluctuate to values tending to render the average direct current zero. Due to this, the interval between detected crossings or coincidences will be distorted, longer intervals being rendered shorter and shorter intervals being rendered longer. However, although the tolerance to noise of the message will be reduced, a difference in length between the shorter and longer lengths will exist and may be detected.

Although one means of receiving and recovering the information has been shown, it will be obvious that many others exist and that for some of these the amplitude modulation will be important to distortion-free recovery of the input information while in others the information may be recovered in the distortion free manner without such amplitude modulation and in still other situations the distortion present when amplitude modulation is not performed will not prevent the detection of the signal.

I claim:

1. A method of transmitting information by means of an electrical signal, comprising the steps of:

providing a first signal;

deriving from said signal a second signal varying above and below a first predetermined potential level to represent symbols by the length of time intervals between successive crossings of said second signal potential level with said predetermined level;

producing from said second signal a third signal whose amplitude varies relative to a second predetermined potential level, to provide crossings separated by intervals corresponding to said second signal crossing intervals whose amplitude varies between said successive third signal crossings to produce relative to said second predetermined potential level, time integrals of the difference between said signal level and said second potential level over the time interval between said successive third signal crossings, which time integrals for shorter half-cycle lengths are more nearly equal to the corresponding time integrals for longer half-cycle lengths than the lengths of the respective half-cycle intervals to themselves.

2. A method of transmitting information wherein a signal is provided comprising the steps of:

providing a first signal; deriving from said first signal a second signal varying above and below a predetermined potential level to represent symbols by the length of time intervals between successive crossings of said second signal potential level with said predetermined level; and amplitude modulating said second signal to provide a modulated signal having successive crossings with a second predetermined level corresponding to said second signal crossings and having a time average deviation of the potential level from said second predetermined value between successive crossings of said second potential level which varies substantially inversely as the time interval between each successive crossings.

3. A method of transmitting information wherein a signal is provided comprising the steps of:

providing a first signal; deriving from said signal a second signal varying above and below a first predetermined potential level to represent symbols by the length of time intervals between successive crossings of said signal potential level with said first predetermined level; an amplitude modulating said second signal to produce a modulated third signal whose maximum potential difference between said third signal level and a second predetermined level, occurring between successive crossings of said second potential level varies substantially inversely as the time interval between said successive crossings.

4. Means for encoding a series of symbols in an electrical signal comprising: means for providing a control signal characteristic of the symbol to be represented, means responsive to said control signal to provide an information signal characteristic of the symbol to be represented, means for producing from said information signal an output signal whose potential level varies above and below a predetermined level, whose successive crossings of said signal level are spaced by the duration of said information signal, and the time integrals of whose signal level relative to said predetermined level are, for shorter and longer periods between successive crossings more nearly equal than the said periods.

5. Means as claimed in claim 4 wherein means are provided for modulating said output signal to produce a modulated signal whose time average of the potential deviations of said potential level from said predetermined level between successive crossings, varies substantially inversely as the interval between said crossings.

6. A method of signalling information in the frequency range 200 to 3200 cycles comprising in combination the steps of: varying the potential of a signal above and below a predetermined potential level; controlling the rate of such variation so that the frequency of said signal remains within said range and so that the time interval between successive crossings of said signal and the predetermined level conveys information; and controlling the range of rates of such variation so that the average frequency of said signal is in the lower half of said range.

7. A method of transmitting information representable by a predetermined number of symbols; comprising:

allotting at least one time interval to each of said symbols;

providing a first electrical signal;

deriving from said signal a second signal varying alternatively above and below a first predetermined potential level at a rate whereby successive crossings of said signal potential level with said first predetermined level occur at intervals corresponding to the time intervals allocated to such symbols;

and deriving from said signal a third signal varied above and below a second predetermined level so that successive crossings of said second predetermined level occur at intervals corresponding to the intervals between said aforesaid second signal crossings, with said third signal amplitude between successive third signal crossings controlled so that the time integrals of the difference between the amplitude of said third signal and said second predetermined level over shorter and longer intervals between said successive crossings, are more nearly equal than the said durations.

References Cited

UNITED STATES PATENTS

| | | | |
|---|---|---|---|
| 3,181,074 | 4/1965 | Cotterill | 307—265 |
| 3,110,819 | 11/1963 | Helms | 325—38 |
| 3,144,609 | 8/1964 | Rumble | 325—38 |
| 3,147,449 | 9/1964 | Lynch | 340—353 |
| 3,191,071 | 6/1965 | King et al. | 307—265 |
| 3,289,170 | 11/1966 | Currey et al. | 340—353 |
| 3,366,882 | 1/1968 | Briley | 325—142 |

KATHLEEN H. CLAFFY, Primary Examiner

ALBERT B. KIMBALL, Jr., Assistant Examiner

U.S. Cl. X.R.

179—15; 307—265; 325—40; 328—58; 332—9; 340—349